US010837369B2

United States Patent
Ramamurthi et al.

(10) Patent No.: US 10,837,369 B2
(45) Date of Patent: Nov. 17, 2020

(54) IGNITER ASSEMBLY FOR A GAS TURBINE COMBUSTOR

(71) Applicant: General Electric Company, Schenectady, NY (US)

(72) Inventors: Badri Narayan Ramamurthi, Clifton Park, NY (US); Svetlana Selezneva, Schenectady, NY (US); Mohamed Rahmane, Ballston Lake, NY (US); Andrey Meshkov, Niskayuna, NY (US); Karim Younsi, Ballston Lake, NY (US); Mark Wayne McWaters, Jacksonville, FL (US); Philip Nose Alberti, Jacksonville, FL (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 380 days.

(21) Appl. No.: 15/684,546

(22) Filed: Aug. 23, 2017

(65) Prior Publication Data

US 2019/0063329 A1 Feb. 28, 2019

(51) Int. Cl.
| | |
|---|---|
| *F02C 7/266* | (2006.01) |
| *F02C 7/26* | (2006.01) |
| *H01T 13/54* | (2006.01) |
| *F02C 7/264* | (2006.01) |
| *H01T 13/52* | (2006.01) |

(52) U.S. Cl.
CPC ............... *F02C 7/266* (2013.01); *F02C 7/26* (2013.01); *F02C 7/264* (2013.01); *H01T 13/52* (2013.01); *H01T 13/54* (2013.01)

(58) Field of Classification Search
CPC .. F02C 7/26; F02C 7/264; F02C 7/266; F05D 2260/85; F01D 9/00

USPC ......... 431/263; 313/118, 140, 141, 142, 143
See application file for complete search history.

(56) References Cited

U.S. PATENT DOCUMENTS

| | | | |
|---|---|---|---|
| 5,314,329 | A | 5/1994 | Lockwood, Jr. |
| 5,367,871 | A | 11/1994 | Venkataramani et al. |
| 5,617,717 | A | 4/1997 | Asquith et al. |
| 6,321,733 | B1 | 11/2001 | Suckewer et al. |
| 7,467,612 | B2 | 12/2008 | Suckewer et al. |
| 8,186,321 | B2 | 5/2012 | Suckewer et al. |

(Continued)

OTHER PUBLICATIONS

Yubo Guann, GuoruiZhao, XinyingXiao, "Design and experiments of plasma jet igniter for aeroengine," Propulsion and Power Research 2013;2(3):188-193 (Year: 2013).*

(Continued)

*Primary Examiner* — Todd E Manahan
*Assistant Examiner* — David P. Olynick
(74) *Attorney, Agent, or Firm* — Fletcher Yoder, P.C

(57) ABSTRACT

An igniter assembly for a gas turbine combustor includes a first electrode, a second electrode, and an insulator. The first electrode, the second electrode, and the insulator form a cavity, the second electrode forms an outlet passage extending from the cavity, a maximum cross-sectional area of the cavity is greater than a cross-sectional area of the outlet passage, and the cross-sectional area of the outlet passage is substantially constant along a longitudinal extent of the outlet passage. In addition, the first electrode and the second electrode are configured to ionize gas within the cavity in response to an electrical current applied to the first electrode or to the second electrode.

9 Claims, 5 Drawing Sheets

(56) References Cited

U.S. PATENT DOCUMENTS

| | | |
|---|---|---|
| 8,622,041 B2 | 1/2014 | Suckewer et al. |
| 8,839,762 B1 * | 9/2014 | Chiera .................. F02B 19/108 123/256 |
| 9,151,265 B1 | 10/2015 | Ikeda |
| 2013/0088140 A1 * | 4/2013 | Kameda .................. F02P 9/007 313/143 |
| 2017/0030297 A1 | 2/2017 | Ueno et al. |

OTHER PUBLICATIONS

Cetegen et al., "Performance of a Plasma Jet Igniter", SAE Technical Paper 800042, pp. 16, Feb. 1, 1980.

* cited by examiner

IGNITER ASSEMBLY FOR A GAS TURBINE COMBUSTOR

BACKGROUND

The subject matter disclosed herein relates to an igniter assembly for a gas turbine combustor.

Gas turbine engines typically include a combustor configured to ignite and combust a fuel-air mixture, thereby generating pressurized exhaust gas. The pressurized exhaust gas may be used to drive a turbine rotor to rotate, and the turbine rotor, in turn, may drive a compressor rotor to rotate (e.g., via a shaft coupled to the turbine rotor and the compressor rotor). Rotation of the compressor rotor may generate pressurized air, which may be combined with fuel and provided to the combustor for ignition and combustion.

The fuel-air mixture within the combustor is typically ignited by one or more igniter assemblies in fluid communication with an interior of the combustor. Certain igniter assemblies include electrodes configured to ionize gas in response to an electrical current applied to one of the electrodes. The ionized gas (e.g., plasma) is emitted from the igniter assembly and ignites the fuel-air mixture within the interior of the combustor. To facilitate interaction between the ionized gas emitted from the igniter assembly and the fuel-air mixture, the tip of the igniter assembly, which emits the ionized gas, it typically positioned proximate to the combustion zone within the interior of the combustor. However, when the combustor is operated at higher temperatures, the tip of the igniter assembly may wear, thereby increasing the frequency of maintenance operations (e.g., removal and replacement of the igniter assembly).

BRIEF DESCRIPTION

In one embodiment, an igniter assembly for a gas turbine combustor includes a first electrode, a second electrode, and an insulator. The first electrode, the second electrode, and the insulator form a cavity, the second electrode forms an outlet passage extending from the cavity, a maximum cross-sectional area of the cavity is greater than a cross-sectional area of the outlet passage, a first longitudinal end of the outlet passage is positioned at an interface between the outlet passage and the cavity, a second longitudinal end of the outlet passage is positioned at a tip of the igniter assembly, and the cross-sectional area of the outlet passage is substantially constant along a longitudinal extent of the outlet passage between the first longitudinal end and the second longitudinal end. In addition, the first electrode and the second electrode are configured to ionize gas within the cavity in response to an electrical current applied to the first electrode or to the second electrode.

In another embodiment, a combustor for a gas turbine system includes a combustor casing having an interior-establishing wall, and a chamber extending to the interior-establishing wall. In addition, the combustor includes an igniter assembly disposed within the chamber such that a tip of the igniter assembly is positioned radially outwardly from the interior-establishing wall. The igniter assembly includes a first electrode, a second electrode, and an insulator. In addition, the first electrode, the second electrode, and the insulator form a cavity, the second electrode forms an outlet passage extending from the cavity, a maximum cross-sectional area of the cavity is greater than a minimum cross-sectional area of the outlet passage, and the first electrode and the second electrode are configured to ionize gas within the cavity in response to an electrical current applied to the first electrode or to the second electrode.

In a further embodiment, an igniter assembly for a gas turbine combustor includes a first electrode, a second electrode, and an insulator. The first electrode, the second electrode, and the insulator form a cavity, the second electrode forms an outlet passage extending from the cavity, a maximum cross-sectional area of the cavity is greater than a minimum cross-sectional area of the outlet passage, the cavity includes a first portion having a cross-sectional area that decreases between the maximum cross-sectional area of the cavity and the outlet passage, the cavity includes a second portion extending from the first electrode to the first portion and having a substantially constant cross-sectional area substantially equal to the maximum cross-sectional area of the cavity, and the second portion is formed only by the insulator and the first electrode. In addition, the outlet passage is the only fluid passage extending from the cavity, and the first electrode and the second electrode are configured to ionize gas within the cavity in response to an electrical current applied to the first electrode or to the second electrode.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
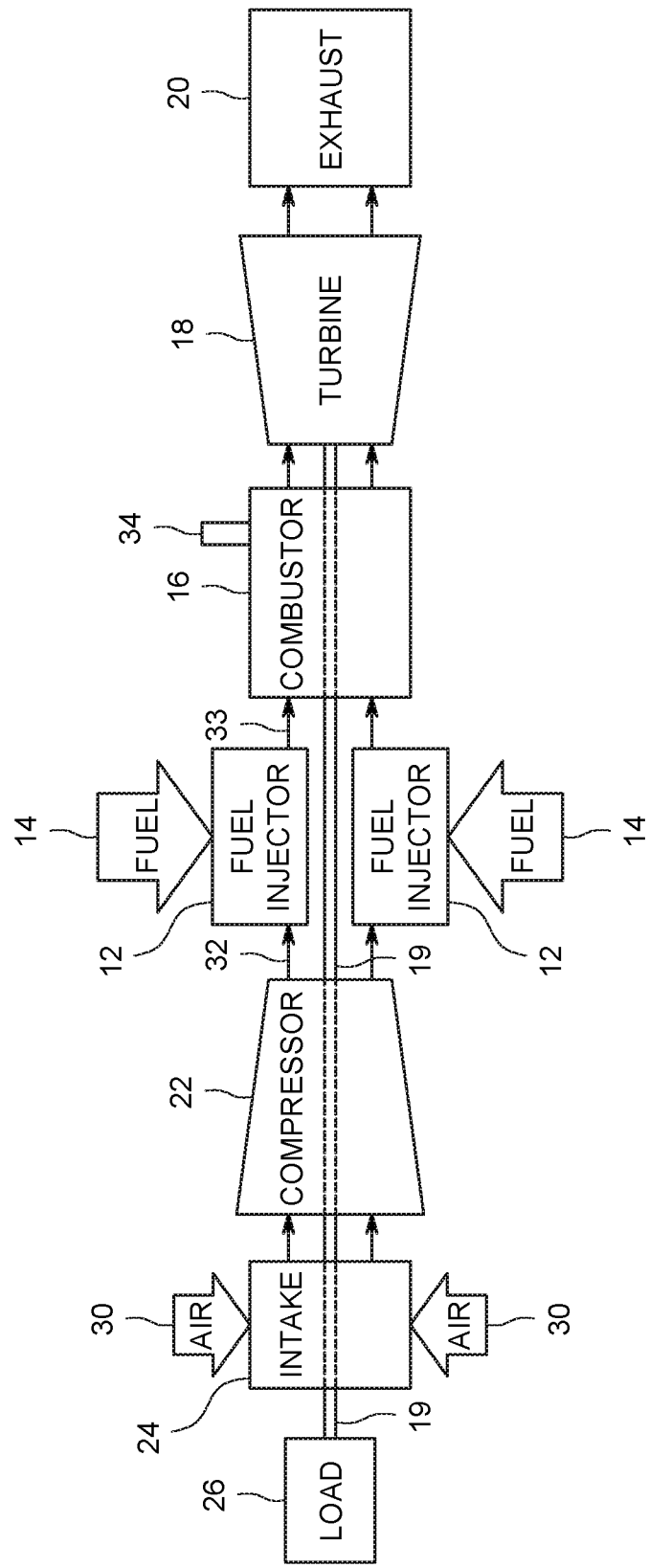
FIG. 1 is a block diagram of an embodiment of a gas turbine system, including an igniter assembly configured to initiate combustion of a fuel-air mixture within a combustor.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments disclosed herein may enhance gas turbine engine operation by providing an igniter assembly configured to generate an ionized gas plume that has a greater propagation distance than the ionized gas plume from a typical igniter assembly, thereby enabling a tip of the igniter assembly to be positioned farther from a combustion zone within the combustor. For example, in certain embodiments, the igniter assembly includes a first electrode (e.g., center electrode), a second electrode (e.g., outer shell electrode), and an insulator. The first electrode, the second electrode, and the insulator form a cavity, and the second electrode forms an outlet passage extending from the cavity. A maximum cross-sectional area of the cavity is greater than a minimum cross-sectional area of the outlet passage. In addition, the first electrode and the second electrode are configured to ionize gas within the cavity and, in certain embodiments, within the outlet passage in response to an electrical current applied to the first electrode or to the second electrode. The ionization of the gas within the cavity induces the gas to expand. Because the minimum cross-sectional area of the outlet passage is less than the maximum cross-sectional area of the cavity, expansion of the gas within the cavity increases the fluid pressure within the cavity. The fluid pressure drives the ionized gas through the outlet passage at a velocity greater than the velocity of gas flowing through an outlet passage having a minimum cross-sectional area equal to or greater than the maximum cross-sectional area of the cavity. Accordingly, a plume having a greater propagation distance is generated (e.g., as compared to a plume generated by an igniter assembly that receives a substantially equal electrical energy input and has an outlet passage with a minimum cross-sectional area equal to or greater than the maximum cross-sectional area of the cavity). The greater plume propagation distance enables the tip of the igniter assembly to be positioned farther from the combustion zone within the combustor, thereby reducing wear on the igniter assembly. As a result, the frequency of maintenance operations may be reduced. In addition, the greater plume propagation distance may increase the likelihood of ignition of the fuel-air mixture, thereby enhancing the capabilities of the gas turbine system. Furthermore, the capability of generating a plume having a greater propagation distance for a particular energy input may enable the igniter assembly to utilize less energy if a shorter plume is desired.

Turning now to the drawings, FIG. 1 is a block diagram of an embodiment of a turbine system 10 (e.g., gas turbine system, turbine engine, gas turbine engine), including an igniter assembly configured to initiate combustion of a fuel-air mixture within a combustor. The turbine system 10 includes a fuel nozzle/injector 12, a fuel supply 14, and a combustor 16. As illustrated, the fuel supply 14 routes a liquid fuel and/or gas fuel, such as jet fuel, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized exhaust gas into a turbine 18. The turbine 18 includes one or more stators having fixed vanes or blades, and one or more rotors having blades that rotate relative to the stators. The exhaust gas passes through the turbine rotor blades, thereby driving the turbine rotor to rotate. Coupling between the turbine rotor and a shaft 19 induces rotation of the shaft 19, which is also coupled to several components throughout the gas turbine system 10, as illustrated. Eventually, the exhaust of the combustion process exits the gas turbine system 10 via an exhaust outlet 20.

A compressor 22 includes blades mounted to a rotor, which is driven to rotate by the shaft 19. As air passes through the rotating blades, air pressure increases, thereby providing the combustor 16 with sufficient air for proper combustion. The compressor 22 intakes air to the gas turbine system 10 via an air intake 24. Further, the shaft 19 may be coupled to a load 26, which is powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. The air intake 24 draws air 30 into the gas turbine system 10 via a suitable mechanism, such as a cold air intake. The air 30 then flows through blades of the compressor 22, which provides compressed air 32 to the combustor 16. For example, the fuel injector 12 may inject the compressed air 32 and fuel 14, as a fuel-air mixture 33, into the combustor 16. Alternatively, the compressed air 32 and fuel 14 may be injected directly into the combustor for mixing and combustion.

In the illustrated embodiment, the combustor 16 includes an igniter assembly 34 configured to initiate combustion of the fuel-air mixture. In certain embodiments, the igniter assembly 34 includes a first electrode (e.g., center electrode), a second electrode (e.g., outer shell electrode), and an insulator. The first electrode, the second electrode, and the insulator form a cavity, and the second electrode forms an outlet passage extending from the cavity. The first electrode and the second electrode are configured to ionize gas within the cavity and, in certain embodiments, within the outlet passage in response to an electrical current applied to the first electrode or to the second electrode. The ionized gas flows from the outlet passage and forms a plume extending into a combustion zone within the combustor. The plume ignites the fuel-air mixture, thereby facilitating combustion within the combustor 16.

Figure 2:
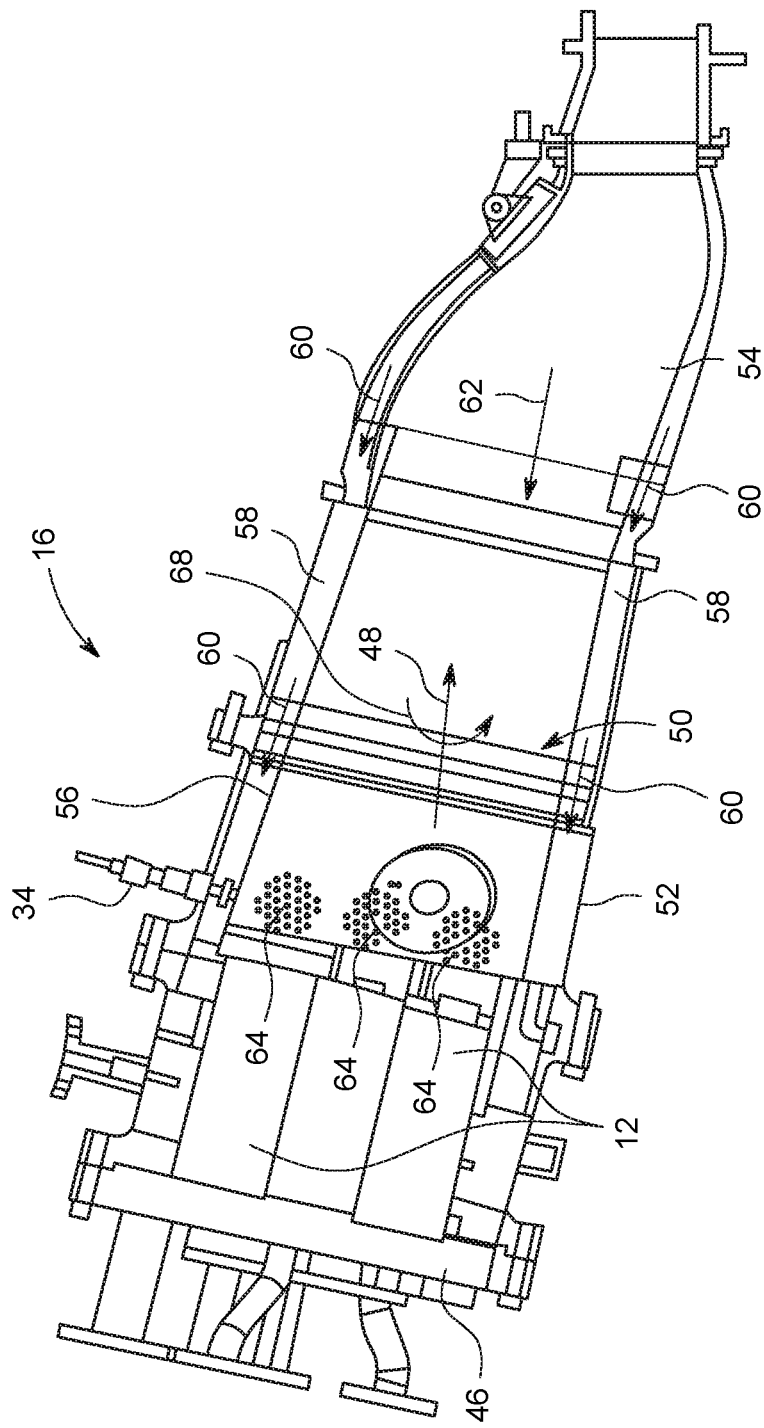
FIG. 2 is a cross-sectional view of an embodiment of a combustor that may be used within the gas turbine system of FIG. 1, including an embodiment of an igniter assembly.

FIG. 2 is a cross-sectional view of an embodiment of a combustor 16 that may be used within the gas turbine system of FIG. 1, including an embodiment of an igniter assembly 34. As illustrated, the combustor 16 includes fuel nozzles 12 that are attached to an end cover 46 at a base of the combustor 16. In certain embodiments, the combustor 16 may include five or six fuel nozzles 12. In other embodiments, the combustor 16 may include a single large fuel nozzle 12. The surfaces and geometry of the fuel nozzles 12 are particularly configured to enhance mixing of the air and fuel as the fuel-air mixture flows downstream through the combustor 16. The enhanced mixing may increase combustor efficiency, thereby producing more power in the turbine engine. The fuel-air mixture is expelled from the fuel nozzles 12 in a downstream direction 48 to a combustion zone 50 inside a combustor casing 52.

In the illustrated embodiment, the combustion zone 50 is located inside the combustor casing 52, downstream from the fuel nozzles 12 and upstream from a transition piece 54, which directs the pressurized exhaust gas toward the turbine 18. The transition piece 54 includes a converging section configured to increase a velocity of the exhaust gas, thereby producing a greater force to drive the turbine rotor in rotation. In the illustrated embodiment, the combustor 16 includes a liner 56 located inside the casing 52 to provide a hollow annular path 58 for a cooling airflow 60, which cools the casing 52 around the combustion zone 50. As illustrated, the cooling airflow 60 flows in an upstream direction 62, opposite the downstream direction 48, through the hollow annular path 58 to the fuel nozzles 12. The airflow 60 then mixes with the fuel to establish a fuel-air mixture suitable for combustion. In certain embodiments, the liner 56 includes cooling holes configured to facilitate passage of the cooling airflow into an interior of the combustor, thereby cooling the liner 56 and/or providing additional air for combustion. Furthermore, the liner 56 may establish a suitable shape to improve flow from the fuel nozzles 12 to the turbine 18.

In the illustrated embodiment, the combustor 16 includes an igniter assembly 34 configured to initiate combustion of the fuel-air mixture. The igniter assembly 34 extends through the casing 52, and an opening in the liner 56 enables a plume of ionized gas from the igniter assembly 34 to extend into the combustion zone 50. The plume ignites the fuel-air mixture, thereby establishing flames 64 within the combustor 16. As discussed in detail below, the igniter assembly 34 generates a plume having a greater propagation distance than plumes generated by typical igniter assemblies, thereby enabling the tip of the igniter assembly to be positioned farther from the combustion zone 50. As a result, wear on the igniter assembly may be reduced, thereby reducing the frequency of maintenance operations on the gas turbine system (e.g., replacing the igniter assembly). In addition, the greater plume propagation distance may increase the likelihood of ignition of the fuel-air mixture, thereby enhancing the capabilities of the gas turbine system. While the illustrated combustor 16 includes one igniter assembly 34, it should be appreciated that in alternative embodiments, the combustor may include additional igniter assemblies, such as 1, 2, 3, 4, 5, 6, 7, 8, 9, 10, or more igniter assemblies.

Figure 3:
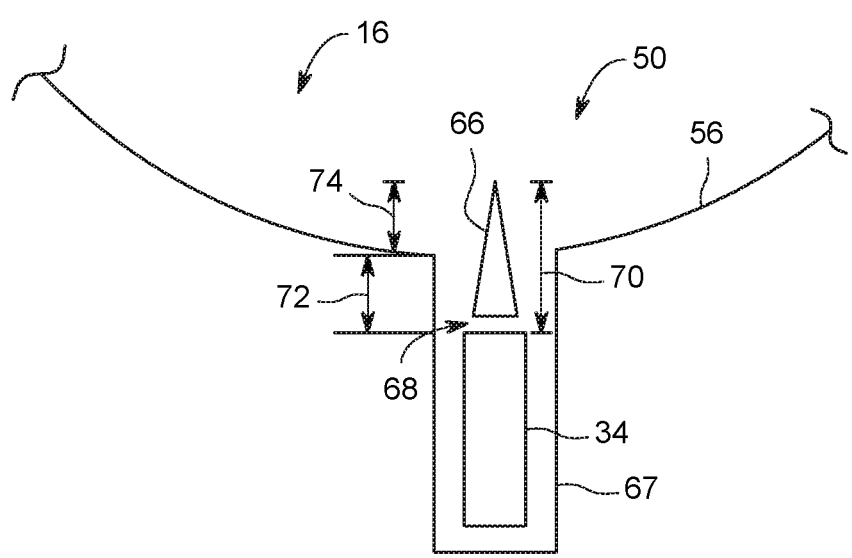
FIG. 3 is a schematic diagram of an embodiment of a combustor having a recessed igniter assembly.

FIG. 3 is a schematic diagram of an embodiment of a combustor 16 having a recessed igniter assembly 34. In certain embodiments, the igniter assembly 34 includes a first electrode (e.g., center electrode), a second electrode (e.g., outer shell electrode), and an insulator. The first electrode, the second electrode, and the insulator form a cavity, and the second electrode forms an outlet passage extending from the cavity. A maximum cross-sectional area of the cavity is greater than a minimum cross-sectional area of the outlet passage. In addition, the first electrode and the second electrode are configured to ionize gas within the cavity and, in certain embodiments, within the outlet passage in response to an electrical current applied to the first electrode or to the second electrode. The ionization of the gas within the cavity induces the gas to expand. Because the minimum cross-sectional area of the outlet passage is less than the maximum cross-sectional area of the cavity, expansion of the gas within the cavity increases the fluid pressure within the cavity. The fluid pressure drives the ionized gas through the outlet passage at a velocity greater than the velocity of gas flowing through an outlet passage having a minimum cross-sectional area equal to or greater than the maximum cross-sectional area of the cavity. Accordingly, a plume 66 of ionized gas having a greater propagation distance is generated (e.g., as compared to a plume generated by an igniter assembly that receives a substantially equal electrical energy input and has an outlet passage with a minimum cross-sectional area equal to or greater than the maximum cross-sectional area of the cavity). The greater plume propagation distance enables a tip 68 of the igniter assembly 34 to be positioned farther from the combustion zone 50 within the combustor 16, thereby reducing wear on the igniter assembly. As a result, the frequency of maintenance operations (e.g., replacement of the igniter assembly) may be reduced. In addition, the greater plume propagation distance may increase the likelihood of ignition of the fuel-air mixture, thereby enhancing the capabilities of the gas turbine system. Furthermore, the capability of generating a plume having a greater propagation distance for a particular energy input may enable the igniter assembly to utilize less energy if a shorter plume is desired.

As illustrated, the igniter assembly 34 is disposed within a chamber 67 that is in fluid communication with an interior (e.g., combustion zone 50) of the combustor 16. In the illustrated embodiment, the chamber 67 extends to the liner 56 (e.g., interior-establishing wall of the combustor). However, it should be appreciated that in alternative embodiments, the chamber may extend to another structure that establishes the interior of the combustor. For example, in certain embodiments, the liner may be omitted, and the chamber may extend to another interior-establishing wall of the combustor casing. The dimensions of the chamber 67 may be particularly selected to accommodate the igniter assembly 34 and to enable the tip 68 of the igniter assembly 34 to be positioned radially outwardly (e.g., recessed within the chamber) from the liner/interior-establishing wall of the combustor.

In certain embodiments, a propagation distance 70 of the plume 66 from the illustrated igniter assembly 34 may be between about 10 mm and about 30 mm, about 11 mm and about 27 mm, or about 12 mm and about 25 mm. By way of further example, the propagation distance 70 of the plume 66 may be greater than 10 mm, greater than 12 mm, greater than 15 mm, greater than 20 mm, or greater than 25 mm. In contrast, the plume propagation distance from a typical igniter may be about 6 mm.

Due to the greater plume propagation distance 70, the tip 68 of the igniter assembly 34 may be positioned a distance 72 radially outwardly from the combustor liner/interior-establishing wall of the combustor (e.g., recessed within the chamber). The recess distance 72 may be about half the propagation distance 70 of the plume 66. For example, if the propagation distance 70 of the plume 66 is about 24 mm, the recess distance 72 may be about 12 mm. Accordingly, the tip 68 of the igniter assembly 34 may be positioned about 12 mm from the liner/interior-establishing wall of the combustor 16, thereby reducing wear on the igniter assembly 34 (e.g., as compared to a typical igniter that generates a plume having a 6 mm propagation distance, in which the tip is positioned radially inward of the combustor liner/interior-establishing wall). In further embodiments, the recess distance 72 may be between about 0 mm and about 15 mm, about 0 mm and about 13 mm, about 1 mm and about 12 mm, or about 2 mm and about 12 mm. By way of further example, the recess distance 72 may be greater than 1 mm, greater than 3 mm, greater than 5 mm, greater than 7 mm, greater than 9 mm, or greater than 11 mm.

Furthermore, if the recess distance 72 is about half of the propagation distance 70 of the plume 66, an impingement distance 74 of the plume 66 into the interior (e.g., combustion zone 50) of the combustor 16 may be about half of the propagation distance 70 of the plume 66. For example, if the propagation distance 70 of the plume 66 is about 24 mm, the impingement distance 74 may be about 12 mm. Accordingly, the likelihood of igniting the fuel-air mixture may be increased (e.g., as compared to an igniter having a tip positioned at the liner/interior-establishing wall and configured to produce a plume having a 6 mm propagation distance). For example, the plume may extend beyond a boundary layer on the surface of the liner/interior-establishing wall and into a recirculation portion of the combustion zone. As a result, the capabilities of the gas turbine system may be enhanced (e.g., by enhancing the re-light capabilities of the combustor while the fuel-air mixture is lean). While the recess distance 72 and the complementary impingement distance 74 are about half the propagation distance 70 of the plume 66 in the illustrated embodiment, it should be appreciated that in alternative embodiments, the recess distance 72 or the impingement distance 74 may be between about 10 percent and about 90 percent, about 20 percent and about 80 percent, about 30 percent and about 70 percent, or about 40 percent and about 60 percent of the propagation distance of the plume. As used herein, "propagation distance" refers to the distance between the tip 68 of the igniter assembly 34 and the tip of the plume 66, and the tip of the plume 66 refers to the point along the length of the plume where the temperature drops below 1500 K. Furthermore, as used herein, "impingement distance" refers to the distance between the combustor liner/interior-establishing wall of the combustor and the tip of the plume 66.

Figure 4:
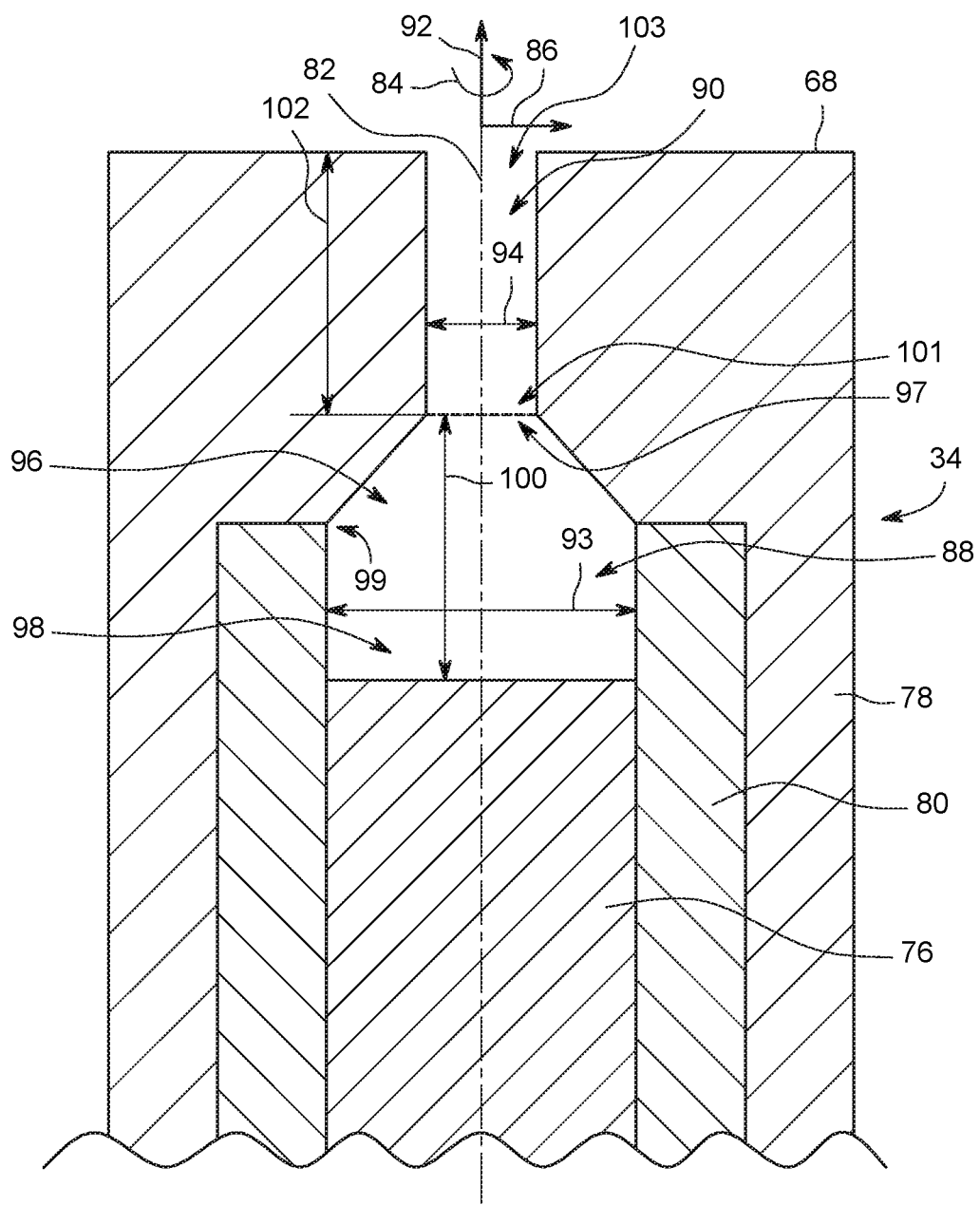
FIG. 4 is a cross-sectional view of an embodiment of an igniter assembly that may be used in the combustor of FIG. 2 and/or in the combustor of FIG. 3.

FIG. 4 is a cross-sectional view of an embodiment of an igniter assembly 34 that may be used in the combustor of FIG. 2 and/or in the combustor of FIG. 3. In the illustrated embodiment, the igniter assembly 34 includes a first electrode, such as the illustrated center electrode 76, a second electrode, such as the illustrated outer shell electrode 78, and an insulator 80. As illustrated, the outer shell electrode 78 is disposed about the center electrode 76, and the insulator 80 is disposed radially between the center electrode 76 and the outer shell electrode 78. In certain embodiments, the igniter assembly 34 is circularly symmetric about a central axis 82. In such embodiments, the igniter assembly 34 may have a circular cross-section within a plane extending perpendicularly to the central axis 82. In addition, the insulator 80 and the outer shell electrode 78 extend about the center electrode 76 along a circumferential axis 84, and the insulator 80 is disposed between the center electrode 76 and the outer shell electrode 78 along a radial axis 86. While the first electrode includes a single center electrode in the illustrated embodiment, it should be appreciated that in alternative embodiments the first electrode may be positioned off-center relative to the central axis and/or may include multiple separate electrodes. In addition, while the second electrode is a single outer shell electrode in the illustrated embodiment, it should be appreciated that in alternative embodiments, the second electrode may not extend about the first electrode and/or may include multiple separate electrodes.

In the illustrated embodiment, the center electrode 76, the outer shell electrode 78, and the insulator 80 form a cavity 88, and the outer shell electrode 78 forms an outlet passage 90 extending from the cavity 88. Indeed, in the illustrated embodiment, the outlet passage 90 is formed only by the outer shell electrode 78. As illustrated, the cavity 88 is positioned between the center electrode 76 and the outlet passage 90 along a longitudinal axis 92.

In the illustrated embodiment, a maximum diameter 93 of the cavity 88 is greater than a minimum diameter 94 of the outlet passage 90. Accordingly, a maximum cross-sectional area of the cavity 88 (e.g., area of the cross-section extending within a plane perpendicular to the central axis 82) is greater than a minimum cross-sectional area of the outlet passage 90 (e.g., area of the cross-section extending within a plane perpendicular to the central axis 82). The center electrode 76 and the outer shell electrode 78 are configured to ionize gas within the cavity 88 and, in certain embodiments, within the outlet passage 90 in response to an electrical current applied to the center electrode 76 or the outer shell electrode 78. The ionization of the gas within the cavity 88 induces the gas to expand. Because the minimum diameter/cross-sectional area of the outlet passage 90 is less than the maximum diameter/cross-sectional area of the cavity 88, expansion of the gas within the cavity 88 increases the fluid pressure within the cavity 88. The fluid pressure drives the ionized gas through the outlet passage 90 at a velocity greater than the velocity of gas flowing through an outlet passage having a minimum diameter/cross-sectional area equal to or greater than a maximum diameter/cross-sectional area of the cavity. Accordingly, a plume having a greater propagation distance is generated (e.g., as compared to a plume generated by an igniter assembly that receives a substantially equal electrical energy input and has an outlet passage with a minimum diameter/cross-sectional area equal to or greater than the maximum diameter/cross-sectional area of the cavity). The greater plume propagation distance enables the tip of the igniter assembly to be positioned farther from the combustion zone within the interior of the combustor, thereby reducing wear on the igniter assembly. As a result, the frequency of maintenance operations (e.g., replacing the igniter assembly) may be reduced. In addition, the greater plume propagation distance may increase the likelihood of ignition of the fuel-air mixture, thereby enhancing the capabilities of the gas turbine system. Furthermore, the capability of generating a plume having a greater propagation distance for a particular energy input may enable the igniter assembly to utilize less energy if a shorter plume is desired.

As illustrated, the cavity 88 includes a first portion 96 having a diameter/cross-sectional area that decreases between the maximum diameter/cross-sectional area 93 of the cavity 88 and the outlet passage 90 (e.g., an interface 97 between the cavity 88 and the outlet passage 90). In the illustrated embodiment, the first portion 96 of the cavity 88 is formed only by the outer shell electrode 78. However, in alternative embodiments, the first portion may be formed only by the insulator, or the first portion may be formed by the insulator and the outer shell electrode. In addition, the cavity 88 includes a second portion 98 extending from the center electrode 76 to the first portion 96. In the illustrated embodiment, the second portion 98 of the cavity 88 is formed only by the insulator 80 and the center electrode 76. However, in alternative embodiments, the second portion may be formed by the insulator, the center electrode, and the outer shell electrode. The interface 99 between the first portion 96 and the second portion 98 is located at the point of maximum diameter/cross-sectional area closest to the outlet passage 90 along the longitudinal axis 92.

In the illustrated embodiment, the second portion 98 of the cavity 88 has a substantially constant diameter/cross-sectional area, which is equal to the maximum diameter/cross-sectional area of the cavity 88. However, it should be appreciated that in alternative embodiments, the second portion of the cavity may have other suitable shapes. For example, the second portion may include one or more diverging sections, one or more converging sections, one or more substantially constant diameter/cross-sectional area sections, or a combination thereof. Furthermore, in the illustrated embodiment, the diameter of the first portion 96 decreases substantially linearly between the maximum diameter 93 of the cavity 88 and the outlet passage 90 (e.g., the interface 97 between the cavity 88 and the outlet passage 90). However, it should be appreciated that in alternative embodiments, the first portion of the cavity may have other suitable shapes. For example, the diameter of the first portion may decrease along a curved path between the maximum diameter of the cavity and the outlet passage, the first portion may include one or more substantially constant diameter/cross-sectional area sections, the first portion may include one or more diverging sections, or a combination thereof. As used herein with reference to the first portion, "decrease" refers to a net decrease in diameter/cross-sectional area between the maximum diameter/cross-sectional area of the cavity (e.g., at the interface 99) and the outlet passage (e.g., at the interface 97). Accordingly, the diameter/cross-sectional area of the first portion may vary locally (e.g., increase and decrease) between the maximum diameter/cross-sectional area of the cavity (e.g., at the interface) and the outlet passage, such that the diameter/cross-sectional area of the first portion at the outlet passage is less than the maximum diameter/cross-sectional area of the cavity.

In the illustrated embodiment, a first longitudinal end 101 of the outlet passage 90 is positioned at the interface 97 between the outlet passage 90 and the cavity 88. In addition, a second longitudinal end 103 of the outlet passage 90 is positioned at the tip 68 of the igniter assembly 34. The diameter/cross-sectional area of the outlet passage 90 is substantially constant and equal to the minimum diameter 94/cross-sectional area of the outlet passage 90 between the first longitudinal end 101 and the second longitudinal end 103. Because the diameter/cross-sectional area of the outlet passage is substantially constant, the manufacturing process of the igniter assembly may be less time-consuming and/or less expensive than the manufacturing process of an igniter assembly having converging and/or diverging section(s). However, it should be appreciated that in alternative embodiments, the outlet passage may include one or more diverging sections, one or more converging sections, one or more substantially constant diameter/cross-sectional area sections, or a combination thereof. For example, the outlet passage may include a constant diameter/cross-sectional area section and a diverging section, and the constant diameter/cross-sectional area section may be positioned between the cavity and the diverging section.

In certain embodiments, the maximum diameter 93 of the cavity 88 may be about 1.5 times greater than the minimum diameter 94 of the outlet passage 90. In such embodiments, the maximum cross-sectional area of the cavity may be more than two times greater than the minimum cross-sectional area of the outlet passage. This configuration may establish a fluid pressure of at least 5 atm within the cavity 88, thereby facilitating the establishment of a plume having a target propagation distance (e.g., about 12 mm to about 24 mm). By way of example, the maximum diameter 93 of the cavity 88 may be about 6 mm, and the minimum diameter 94 of the outlet passage 90 may be about 4 mm. However, it should be appreciated that the maximum diameter 93 of the cavity 88, the minimum diameter 94 of the outlet passage 90, the maximum cross-sectional area of the cavity 88, the minimum cross-sectional area of the outlet passage 90, or a combination thereof, may be particularly selected to achieve a target fluid pressure within the cavity 88 and/or a target plume propagation distance, among other target operating parameters of the igniter assembly. For example, in certain embodiments, the maximum diameter of the cavity may be between about 1.05 and about 3, about 1.1 and about 2.5, about 1.2 and about 2, about 1.3 and about 1.8, or about 1.4 and about 1.6 times greater than the minimum diameter of the outlet passage. Furthermore, in certain embodiments, the maximum cross-sectional area of the cavity may be about 1.1 and about 10, about 1.5 and about 8, about 2 and about 6, about 2 and about 5, or about 2 and about 3 times greater than the minimum cross-sectional area of the outlet passage. By way of further example, the maximum cross-sectional area of the cavity may be more than 2, 3, 4, 5, 6, 7, 8, or 9 times greater than the minimum cross-sectional area of the outlet passage. Furthermore, in certain embodiments, the maximum diameter 93 of the cavity 88 may be between about 1 mm and about 20 mm, about 2 mm and about 15 mm, about 4 mm and about 10 mm, about 5 mm and about 7 mm, or about 6 mm. In addition, in certain embodiments, the minimum diameter 94 of the outlet passage 90 may be between about 1 mm and about 15 mm, about 2 mm and about 12 mm, about 3 mm and about 10 mm, about 4 mm and about 6 mm, or about 4 mm and about 5 mm. While the target pressure within the cavity is at least 5 atm in certain embodiments, it should be appreciated that in other embodiments, the target pressure within the cavity may be at least 2 atm, at least 3 atm, at least 4 atm, at least 5 atm, at least 6 atm, at least 7 atm, at least 8 atm, at least 9 atm, at least 10 atm, or more.

In the illustrated embodiment, a longitudinal extent 100 of the cavity 88 (e.g., the extent of the cavity along the longitudinal axis 92) is greater than a longitudinal extent 102 of the outlet passage 90 (e.g., the extent of the outlet passage along the longitudinal axis 92). For example, in certain embodiments, the longitudinal extent 100 of the cavity 88 may be about twice the longitudinal extent 102 of the outlet passage 90. By way of further example, the longitudinal extent 100 of the cavity 88 may be between about 0.5 and about 10, about 1.0 and about 8.0, about 1.5 and about 7.0, about 2.0 and about 5.0, or about 2.0 and about 3.0 times longer than the longitudinal extent 102 of the outlet passage 90. In certain embodiments, the longitudinal extent 100 of the cavity 88 may be between about 1 mm and about 10 mm, about 2 mm and about 8 mm, about 3 mm and about 7 mm, or about 4 mm and about 6 mm. For example, the longitudinal extent 100 of the cavity 88 may be about 2.1 mm, about 3 mm, about 7.1 mm, or about 8 mm. In addition, the longitudinal extent 102 of the outlet passage 90 may be between about 0.5 mm and about 5 mm, about 0.75 mm and about 4 mm, or about 1 mm and about 3 mm. For example, the longitudinal extent 102 of the outlet passage 90 may be about 0.9 mm or about 2.9 mm. The longitudinal extent of the cavity and the longitudinal extent of the outlet passage may be particularly selected to achieve a target pressure within the cavity and/or to establish a target plume propagation distance, among other target operating parameters of the igniter assembly.

In the illustrated embodiment, the outlet passage 90 is the only fluid passage extending from the cavity 88. Accordingly, gas and, in certain embodiments, liquid droplets from the interior of the combustor (e.g., fuel, air, combustion products, exhaust gas, etc.) may enter the cavity 88 via the outlet passage 90. In response to applying an electrical current to the center electrode 76 or to the outer shell electrode 78, the gas within the cavity 88 may be ionized and, in certain embodiments, the liquid droplets within the cavity 88 may be vaporized and ionized. The ionization of the gas within the cavity 88 may induce the ionized gas to expand. Because the minimum diameter/cross-sectional area of the outlet passage is less than the maximum diameter/cross-sectional area of the cavity, expansion of the gas within the cavity increases the fluid pressure within the cavity 88, and the fluid pressure drives the ionized gas through the outlet passage 90. While the igniter assembly includes a single fluid passage extending to/from the cavity in the illustrated embodiment, it should be appreciated that in alternative embodiments, multiple fluid passages may extend to/from the cavity. For example, in certain embodiments, the igniter assembly may have an inlet configured to receive gas for ionization.

As previously discussed, in certain embodiments, the igniter assembly has a substantially circular cross-sectional shape (e.g., shape of the cross-section within a plane extending perpendicularly to the central axis 82). Accordingly, each of the center electrode, the outer shell electrode, and the insulator may have a substantially circular cross-sectional shape. In addition, in certain embodiments, each of the cavity and the outlet passage may have a substantially circular cross-sectional shape. However, it should be appreciated that in alternative embodiments, the cavity and/or the outlet passage may have another suitable cross-sectional shape, such as elliptical or polygonal, among other suitable shapes. Furthermore, in certain embodiments, the center electrode, the outer shell electrode, the insulator, or a combination thereof may have other suitable cross-sectional shapes. For example, at least one of the center electrode, the insulator, and the outer shell electrode may have an elliptical or polygonal cross-sectional shape, or another suitable cross-sectional shape. Furthermore, the radially inward surface of the insulator and/or the outer shell electrode may have a cross-sectional shape corresponding to the cross-sectional shape of the cavity, and/or the radially inward surface of the outer shell electrode may have a cross-sectional shape correspond to the cross-sectional shape of the outlet passage. As used herein, "cross-sectional area" refers to the area of the cross-section of the cavity/outlet passage within a plane extending perpendicularly to the central axis 82, regardless of the cross-sectional shape of the cavity/outlet passage.

Figure 5:
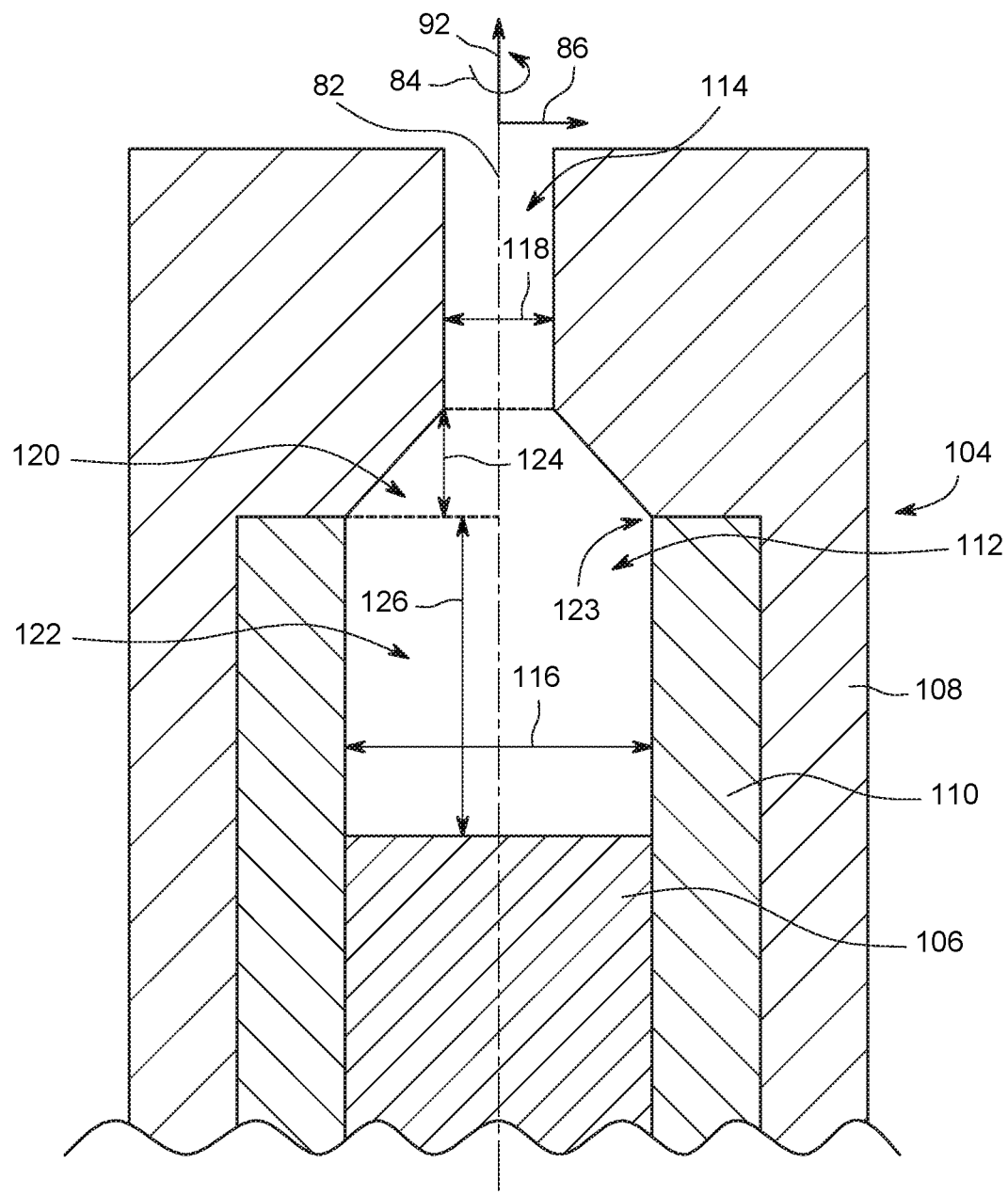
FIG. 5 is a cross-sectional view of another embodiment of an igniter assembly that may be used in the combustor of FIG. 2 and/or in the combustor of FIG. 3.

FIG. 5 is a cross-sectional view of another embodiment of an igniter assembly 104 that may be used in the combustor of FIG. 2 and/or in the combustor of FIG. 3. In the illustrated embodiment, the igniter assembly 104 includes a center electrode 106, an outer shell electrode 108 disposed about the center electrode 106, and an insulator 110 disposed between the center electrode 106 and the outer shell electrode 108. In the illustrated embodiment, the center electrode 106, the outer shell electrode 108, and the insulator 110 form a cavity 112, and the outer shell electrode 108 forms an outlet passage 114 extending from the cavity 112. As illustrated, the cavity 112 is positioned between the center electrode 106 and the outlet passage 114 along the longitudinal axis 92.

In the illustrated embodiment, a maximum diameter 116 of the cavity 112 is greater than a minimum diameter 118 of the outlet passage 114. Accordingly, a maximum cross-sectional area of the cavity 112 (e.g., area of the cross-section extending within a plane perpendicular to the central axis 82) is greater than a minimum cross-sectional area of the outlet passage 114 (e.g., area of the cross-section extending within a plane perpendicular to the central axis 82). The center electrode 106 and the outer shell electrode 108 are configured to ionize gas within the cavity 112 and, in certain embodiments, within the outlet passage 114 in response to an electrical current applied to the center electrode 106 or to the outer shell electrode 108.

As illustrated, the cavity 112 includes a first portion 120 having a diameter/cross-sectional area that decreases between the maximum diameter/cross-sectional area 116 of the cavity 112 and the outlet passage 114. In the illustrated embodiment, the first portion 120 of the cavity 112 is formed only by the outer shell electrode 108. In addition, the cavity 112 includes a second portion 122 extending between the center electrode 106 and the first portion 120. In the illustrated embodiment, the second portion 122 of the cavity 112 is formed by the insulator 110 and the center electrode 106. The interface 123 between the first portion 120 and the second portion 122 is located at the point of maximum diameter/cross-sectional area closest to the outlet passage 114 along the longitudinal axis 92.

In the illustrated embodiment, a longitudinal extent 124 of the first portion 120 (e.g., extent of the first portion 120 along the longitudinal axis 92) is about 1 mm. However, it should be appreciated that in alternative embodiments, the longitudinal extent 124 of the first portion 120 may be between about 0.1 mm and about 10 mm, about 1 mm and about 8 mm, about 2 mm and about 6 mm, or about 2 mm and about 4 mm. For example, the longitudinal extent 124 of the first portion 120 may be about 0.1 mm or about 1 mm. In addition, a longitudinal extent 126 of the second portion 122 (e.g., extent of the second portion 122 along the longitudinal axis 92) is about 7 mm. However, it should be appreciated that in alternative embodiments, the longitudinal extent 126 of the second portion 122 may be between about 1 mm and about 10 mm, about 2 mm and about 8 mm, about 3 mm and about 7 mm, or about 5 mm and about 7 mm. For example, the longitudinal extent 126 of the second portion 122 may be about 2 mm or about 7 mm. In addition, in certain embodiments, the longitudinal extent 126 of the second portion 122 may be between about 0.5 and about 10, about 1 and about 7, about 1.6 and about 6, or about 2 and about 5 times greater than the longitudinal extent 124 of the first portion 120. The longitudinal extent of the first portion, the longitudinal extent of the second portion, the maximum diameter/cross-sectional area of the cavity, the minimum diameter/cross-sectional area of the outlet passage, the shape of the first portion of the cavity (e.g., cross-sectional shape, profile, etc.), the shape of the second portion of the cavity (e.g., cross-sectional shape, profile, etc.), the shape of the outlet passage (e.g., cross-sectional shape, profile, etc.), or a combination thereof, may be particularly selected to achieve a target pressure within the cavity and/or to establish a target plume propagation distance, among other target operating parameters of the igniter assembly.

This written description uses examples to disclose the igniter assembly, including the best mode, and also to enable any person skilled in the art to practice the igniter assembly, including making and using any devices or systems and performing any incorporated methods. The patentable scope of the igniter assembly is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An igniter assembly for a gas turbine combustor, comprising:
   a first electrode, a second electrode, and an insulator, wherein the first electrode, the second electrode, and the insulator form a cavity, the second electrode forms an outlet passage extending from the cavity, a maximum cross-sectional area of the cavity is greater than a cross-sectional area of the outlet passage, a first longitudinal end of the outlet passage is positioned at an interface between the outlet passage and the cavity, a second longitudinal end of the outlet passage is positioned at a tip of the igniter assembly, the cavity includes a converging section extending to the interface with the outlet passage, and the cross-sectional area of the outlet passage is substantially constant along a longitudinal extent of the outlet passage between the first longitudinal end and the second longitudinal end;

wherein the cavity includes a first portion forming the converging section, the first portion has a cross-sectional area that decreases between the maximum cross-sectional area of the cavity and the interface with the outlet passage, and the first portion is formed only by the second electrode;

wherein the cavity includes a second portion having a substantially constant cross-sectional area substantially equal to the maximum cross-sectional area of the cavity, and the second portion is formed only by the insulator and the first electrode; and wherein the first electrode and the second electrode are configured to ionize gas within the cavity in response to an electrical current applied to the first electrode or to the second electrode.

2. The igniter assembly of claim 1, wherein a longitudinal extent of the cavity is greater than the longitudinal extent of the outlet passage.

3. The igniter assembly of claim 2, wherein the longitudinal extent of the cavity is about twice the longitudinal extent of the outlet passage.

4. The igniter assembly of claim 1, wherein the first electrode comprises a center electrode, the second electrode comprises an outer shell electrode disposed circumferentially about the center electrode, and the insulator is disposed radially between the center electrode and the outer shell electrode.

5. The igniter assembly of claim 1, wherein the maximum cross-sectional area of the cavity is more than two times greater than the cross-sectional area of the outlet passage.

6. The igniter assembly of claim 1, wherein the outlet passage is the only fluid passage extending from the cavity.

7. An igniter assembly for a gas turbine combustor, comprising:

a first electrode, a second electrode, and an insulator, wherein the first electrode, the second electrode, and the insulator form a cavity, the second electrode forms an outlet passage extending from the cavity to a tip of the igniter assembly, the outlet passage has a substantially constant cross-sectional area along a longitudinal extent of the outlet passage from the cavity to the tip of the igniter assembly, a maximum cross-sectional area of the cavity is greater than the substantially constant cross-sectional area of the outlet passage, the cavity includes a converging section having a cross-sectional area that decreases continuously from the maximum cross-sectional area of the cavity to the outlet passage, the converging section extends to an interface between the cavity and the outlet passage, the converging section is formed only by the second electrode, the cavity includes a substantially constant cross-sectional area section extending from the first electrode to the converging section, the substantially constant cross-sectional area section has a substantially constant cross-sectional area substantially equal to the maximum cross-sectional area of the cavity, and the substantially constant cross-sectional area section is formed only by the insulator and the first electrode;

wherein the outlet passage is the only fluid passage extending from the cavity; and wherein the first electrode and the second electrode are configured to ionize gas within the cavity in response to an electrical current applied to the first electrode or to the second electrode.

8. The igniter assembly of claim 7, wherein the first electrode comprises a center electrode, the second electrode comprises an outer shell electrode disposed circumferentially about the center electrode, and the insulator is disposed radially between the center electrode and the outer shell electrode.

9. The igniter assembly of claim 7, wherein a longitudinal extent of the cavity is greater than a longitudinal extent of the outlet passage.

\* \* \* \* \*